UNITED STATES PATENT OFFICE.

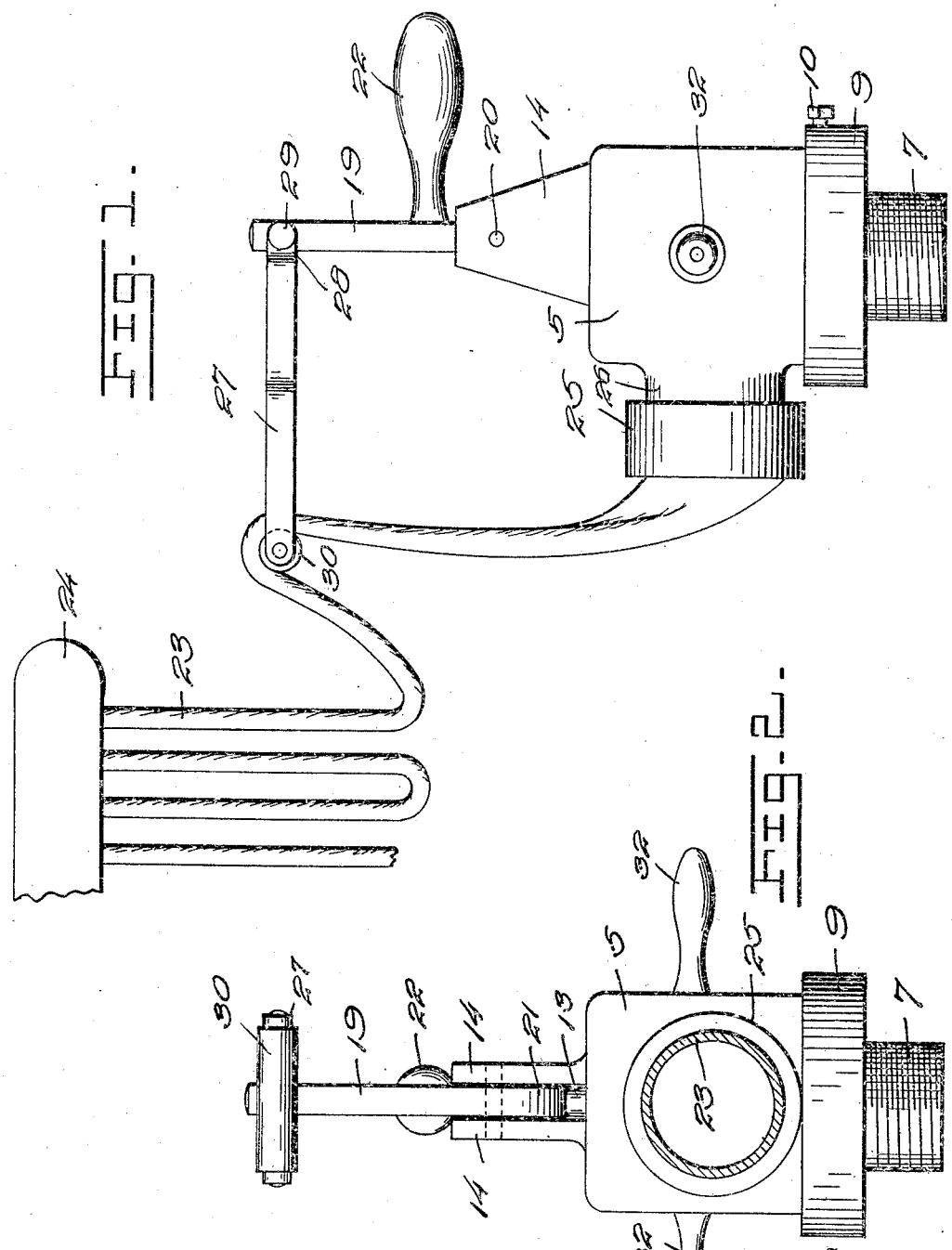

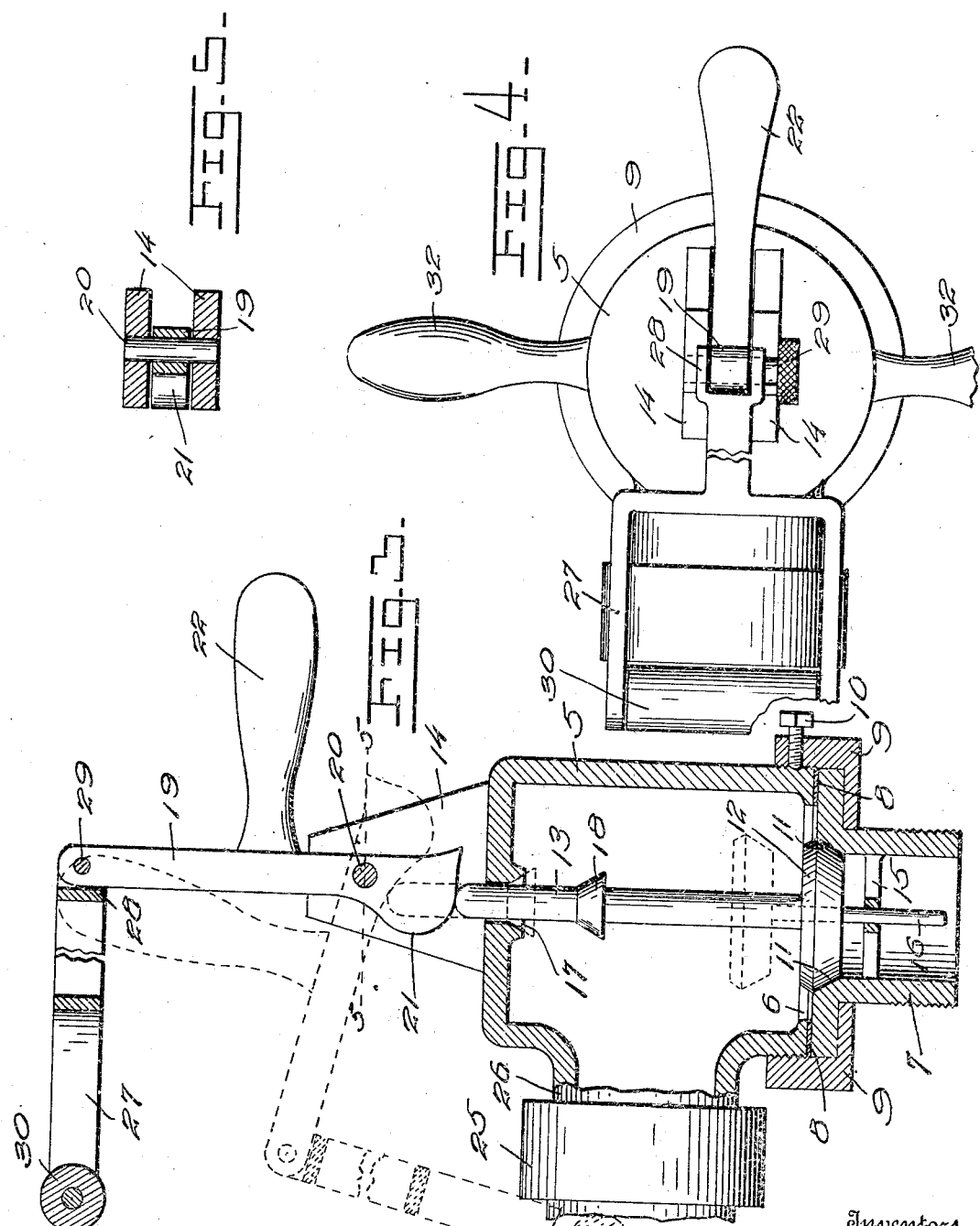

LESLIE E. SMITH AND WILLIAM SMITH, OF TUPELO, MISSISSIPPI.

AUTOMATIC HOSE-VALVE.

958,779.  Specification of Letters Patent.  Patented May 24, 1910.

Application filed November 15, 1909. Serial No. 528,209.

*To all whom it may concern:*

Be it known that we, LESLIE E. SMITH and WILLIAM SMITH, citizens of the United States, residing at Tupelo, in the county of Lee and State of Mississippi, have invented certain new and useful Improvements in Automatic Hose-Valves, of which the following is a specification.

This invention relates to new and useful improvements in hose valves such as are employed in connection with the common stand-pipe system for protection against fire in large buildings, and has for its primary object to provide a valve of this character having means for normally maintaining the valve closed, and adapted to be automatically operated by the pulling or unreeling of the hose to automatically open the valve.

Another object is to provide a valve, wherein the valve casing is swiveled upon a suitable support connected to the water main pipe, whereby the valve may be readily turned in the direction of the fire.

A further object is to provide a valve casing having a cam lever pivotally mounted thereon adapted to normally bear upon the upper end of the valve stem and retain the valve in its seat against water pressure, the valve stem being provided with a supplemental valve which is adapted to be seated in the top of the casing to prevent leakage upon the opening of the main valve.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification, like numerals of reference indicate similar parts in the several views, Figure 1 is a side elevation of my improved valve, showing the hose attached thereto. Fig. 2 is a front end elevation thereof. Fig. 3 is an enlarged vertical section through the valve. Fig. 4 is a top plan view thereof. Fig. 5 is a section taken on the line 5—5 of Fig. 3.

Our improved valve is primarily designed with a view to its use in connection with stand-pipes as commonly employed for protection against fire, and is adapted to automatically open the valve upon the taking down or unreeling of the fire hose. It will be understood, however, that the valve may be employed equally as well in many other instances where the automatic opening of the valve would be desirable. To this end we have provided the valve casing 5, which is supported upon the upper flanged end 6 of a connecting pipe 7. This pipe 7 is exteriorly threaded at its lower end for connection to the main water pipe. Between the flange 6 and the valve casing 5, a packing ring 8 is disposed, and is adapted to minimize the friction between the opposed surfaces of the flange 6 and the valve casing 5. The usual coupling ring 9 is provided with interior threads for engagement with the threads formed upon the lower end of the valve casing 5, and is adapted to rotate with the valve casing upon the flange 6, the ring 9 engaging with the under surface thereof. A set screw 10 retains the coupling ring in position upon the end of the valve casing, and overcomes all liability of the ring being released from the casing upon the rotation thereof. The connecting pipe 7 is formed with a suitable valve seat 11 in which the valve 12 is normally positioned. The valve 12 has formed integral therewith the valve stem 13 which extends through the top of the valve casing, and between the ears 14 formed thereon.

To provide a suitable guide upon the lower end of the valve, a spider 15 is formed in the connecting pipe 7 and is provided with a central aperture through which extends the rod or stem 16 which is of considerably less diameter than the valve stem 13. The central portion of the valve casing at the upper end of the valve stem 13, is formed with a valve seat 17 which receives the supplementary valve 18, carried by the valve stem. The opening in the top of the valve casing through which the stem 13 extends is of a larger diameter than the valve stem, so as to prevent any binding of the stem in the opening which might occur after the valve had been out of use for several years. The supplemental valve 18 will therefore securely close this opening upon the unseating of the valve 12, and prevent any leakage from the top of the valve casing.

A cam lever 19 is pivotally mounted upon the pin 20 between the ears 14, and the lower cam portion 21 thereof is adapted to engage with the upper end of the valve stem 13 and normally maintain the valve 12 in the valve seat 11. It will be noted that the pivot pin 20 is out of vertical alinement with the center of the valve stem 13, and the cam portion 21 is disposed upon the opposite side of the longitudinal center of the valve stem. A counter weight 22 is formed upon the cam lever, and is adapted to retain the lower end of the lever in engagement with the valve stem against the weight of the fire hose which is connected to the upper end of the cam lever as will now be described. The fire hose 23 is supported in a suitable rack 24, and has secured to one end thereof the usual coupling head 25 which has threaded engagement with the extension 26 integrally formed with the valve casing 5. Upon the other end of the hose 23, a nozzle of any desired construction is secured. The hose is supported in a U-shaped member 27, which is formed with a bifurcated stem portion whereby it may be secured to the cam lever 19. As shown in the drawings the bifurcated end 28 of the member 27 is engaged upon either side of the lever 19 and is secured thereto by means of a set screw 29. In the outer end of the U-shaped member 27, a roller 30 is secured over which passes the hose 23. Upon opposite sides of the valve casing 5 handles 32 are formed by means of which the valve may be readily turned to any position desired.

In the operation of the device, when the hose 23 is removed from the rack, the cam lever 19 will be thrown to the left against the weight of the extension 22 formed thereon, whereupon the pressure of the water will force the valve 12 and stem 13 upwardly, until the supplemental valve 18 is engaged in the valve seat 17, as shown in dotted lines in Fig. 3. The water of course, now passes from the valve 5 into the hose pipe 23. When it is desired to return the valve 12 to its seat 11, the member 27 may be detached from the end of the cam lever 19, and the lever readily returned to its vertical position by grasping the counter weight 22 and moving the same upwardly. The cam 21 will thus be brought to bear upon the upper end of the stem 13, and hold the valve in its closed position. The U-shaped member 27 may now be again attached to the lever 19, and the hose folded into position until again required for use.

From the foregoing it will be seen that we have provided an improved valve whereby the valve may be quickly and automatically opened by the movement of the fire hose, so that no time need be lost as is occasioned by the ordinary valve which must be opened by hand.

The construction of our improved valve is very simple, and the parts may be readily assembled into position. As the valve casing 5 is swiveled upon the connecting pipe 7, it may be readily turned to any desired position and the water directed from the hose 23 upon the point at which the fire originated.

The device is absolutely positive in its operation, and the opening of the valve is instantaneous.

The various parts are formed of cast metal, thus providing a valve of very inexpensive construction which may be readily installed without necessitating any change in the ordinary construction of the standpipe system.

What is claimed is:

1. The combination with a valve casing, of a support for said casing, a valve seat formed therein, a valve and stem in alinement with said seat, the upper end of the valve stem extending exteriorly of the valve casing, a cam lever pivotally mounted above said casing normally adapted to close said valve, and a hose supported by the cam lever adapted to operate the same to open said valve.

2. The combination with a valve casing, of a support for said casing, a valve seat formed therein, a valve and stem in alinement with said seat, the upper end of said stem extending exteriorly of the valve casing, a supplemental valve carried by said stem, a valve seat formed in the top of the valve casing adapted to receive said supplemental valve, a cam lever pivotally mounted above said casing, the pivotal point of said lever being out of alinement with the longitudinal center of the valve stem, and a counter weight integrally formed with said lever, and adapted to normally retain the same in engagement with the valve stem.

3. The combination with a valve casing rotatably mounted upon the flanged end of a connecting pipe, a coupling ring threaded upon the end of said casing, and adapted to retain the same in position upon the connecting pipe, a valve seat formed in the connecting pipe, a valve and stem vertically movable in said casing, said valve being normally engaged in the valve seat, ears formed upon the top of said casing, said valve stem extending exteriorly of the casing between said ears, a supplemental valve upon said stem, a valve seat formed in the top of said casing adapted to receive said supplemental valve, a cam lever pivoted between said ears, the cam portion of said lever being normally engaged with the end of the valve stem to retain the valve in closed position, and a counter weight integrally formed with said lever to retain the same in engagement with the valve stem.

4. The combination with a valve casing rotatably mounted upon the flanged end of a connecting pipe, a coupling ring threaded upon said casing and movable therewith, a valve seated in said connecting pipe, a spider formed in said pipe below the valve, a guide rod extending through a central aperture formed in said spider, ears formed upon the top of said valve casing, said valve stem extending through the casing between said ears, a lever pivoted between said ears out of vertical alinement with said valve stem, a cam formed upon the lower end of said lever adapted to maintain said valve in its seat, a counter weight integrally formed with said lever normally acting to retain said cam in engagement with the valve stem, and a hose supporting member secured to the upper end of said lever.

5. The combination with a valve casing having an inlet and outlet opening, a valve seated in said inlet opening, a valve stem vertically extending therefrom, said stem being positioned through an opening formed in the top of the valve casing, a cam lever pivoted above the valve casing and normally engaging with said valve stem to retain the valve in its closed position, a hose, a hose supporting member removably secured to the upper end of said cam lever, the outer end of said member having a roller positioned therein, over which the hose is adapted to pass, the end of said hose being provided with a suitable coupling member for connection to the outlet opening of the valve, and a counter weight integrally formed with said lever adapted to retain the same in its normal position against the weight of the hose.

6. The combination with a valve casing having an inlet and outlet opening, a valve seated in said inlet opening, a valve stem vertically extending therefrom, said stem being positioned through an opening formed in the top of the valve casing, ears vertically positioned upon the top of said valve casing upon either side of the valve stem, a lever pivoted between said ears out of vertical alinement with the valve stem, said lever normally engaging with the end of the valve stem to retain the valve in its closed position, a hose, a hose supporting member removably secured to the upper end of said lever, the outer end of said member being of U-shaped foromation and having a roller positioned therein over which the hose is adapted to pass, the weight of the hose tending to operate said lever to open the valve, one end of said hose being provided with a suitable coupling member for connection to the outlet opening of the valve, and a counter weight integrally formed with said lever and oppositely positioned with relation to the hose supporting member, adapted to retain the lever in engagement with the valve stem to normally maintain the valve in closed position.

In testimony whereof we affix our signatures, in presence of two witnesses.

LESLIE E. SMITH.
WILL. SMITH.

Witnesses:
  C. G. MURFF,
  H. A. MORELAND.